Feb. 17, 1942.    E. H. PIRON    2,273,659
METHOD OF GRINDING
Original Filed April 8, 1935
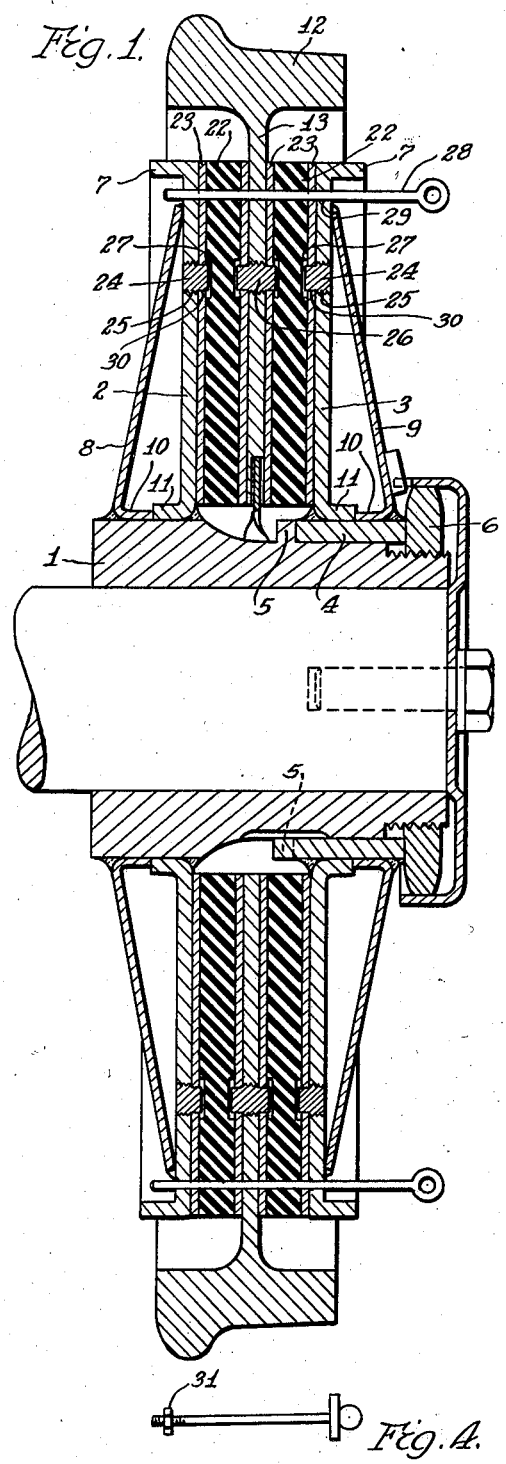
Fig. 1.
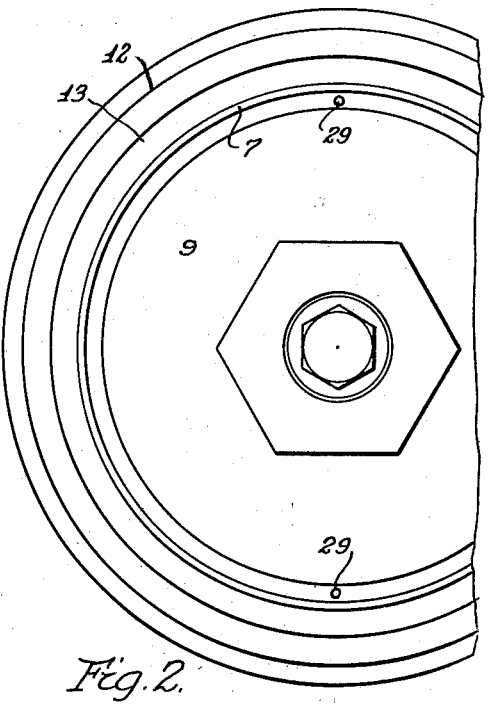
Fig. 2.
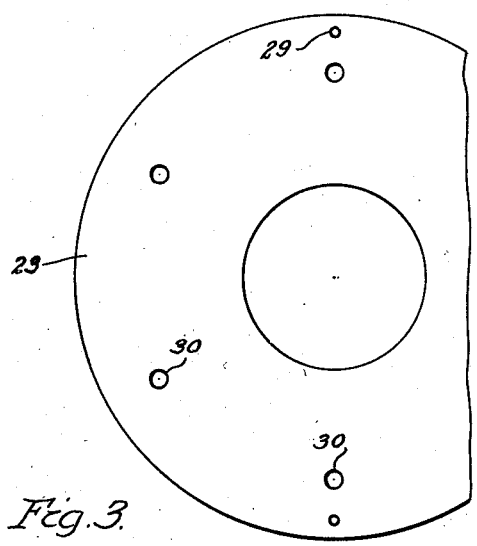
Fig. 3.
Fig. 4.
INVENTOR.
Emil H. Piron
BY J. Windsor Davis
ATTORNEY.

Patented Feb. 17, 1942

2,273,659

UNITED STATES PATENT OFFICE 2,273,659

METHOD OF GRINDING

Emil H. Piron, New York, N. Y., assignor to Transit Research Corporation, a corporation of New York Original application April 8, 1935, Serial No. 15,151, now Patent No. 2,138,506, dated November 29, 1938. Divided and this application November 23, 1938, Serial No. 241,907

1 Claim. (Cl. 51—281)

This invention relates to resilient wheels particularly adapted for use on rail vehicles, of the type wherein a metallic tire is supported by rubber discs in shear. This application is a division of application Serial No. 15,151, filed April 8, 1935, for Wheels, now Patent No. 2,138,506, dated Nov. 29, 1938.

It is well understood in the art that a rail wheel is given a driving fit with its axle so that when the wheel is removed for re-surfacing of its tread it is a difficult and expensive matter to replace the wheel on its hub in exact accordance with its original alinement. Resilient wheels of the general type herein described have been suggested in numerous prior patents and some of them have, in fact, been built, but they too are also subject, for the most part, to the drawback that they must be bodily removed from their axle for resurfacing of the tread and for replacement of the rubber. Research by applicant indicates that commercial success can be attained with wheels of this type only by providing a wheel comprising a hub portion integral with one main radial metallic shear plate and the remainder of the wheel including the other main radial plate, the rubber discs and the tire carrying member all readily demountable therefrom without removing the hub portion from the axle. This entails means to exactly center the rubber elements with respect to the hub, means for exactly centering the tire carrying member with respect to the rubber elements and the hub for if the assembly is not exact it is obvious that the tire will be eccentric with respect to its axis of rotation, and means capable of preventing relative dislocation of the several members during severe operation.

A principal object of the present invention is to teach the method of grinding a wheel meeting the foregoing requirements, or in other words a wheel which uses auxiliary metallic plates bonded to each side of each rubber element and provided with dowel or locating means which are also transmitting means for both radial and tangential loads.

Another and important object of this invention is to provide a method of grinding the metal tire of a resilient wheel, wherein the resiliency of the tire springing elements is obviated whereby the tire becomes rigid with respect to the hub during grinding.

Another object is to provide means for use in conjunction with a resilient wheel for holding the metal rim thereof fixed with respect to the hub of the wheel.

Another object is to provide means for readily assembling a wheel of this type wherein the inner elements cannot be readily seen for accurate placement.

Other objects and advantages will become hereinafter more fully apparent as reference is had to the accompanying drawing wherein my invention is illustrated and in which:

Fig. 1 is a transverse diametric section through a rail wheel constructed in accordance with my invention, Fig. 2 is an elevation of the wheel, Fig. 3 is an elevation of one of the discs, and Fig. 4 is an elevation of the pin used in grinding operations.

1 indicates the wheel hub having two stiff plates 2 and 3 radiating therefrom. The plate 2 is integrally secured to the hub 1, as by welding, and the plate 3 is integrally secured to a collar 4 slidably mounted on the hub 1. Teeth or clutch elements 5 lock the collar for rotation with the hub and a nut 6 threaded onto the hub 1 retains the clutch elements 5 in engagement. It is highly desirable to build the plates 2 and 3 out of sheet metal and in order that sufficient rigidity may be obtained the outer edge 7 of each plate is flared outwardly to form a stiffening flange substantially normal to the main surface as shown in Fig. 1, or of other suitable shape. As a further stiffening means, conical bracing plates 8 and 9 are provided, the plate 8 being welded at its outer edge to the plate 2 and the outer edge of the plate 9 being welded to the member 3. The inner edges of both plates 8 and 9 are turned inwardly at 10 for close fitting engagement with the hub 1 and collar 4 respectively, the inner edges of each plate 2, 3 being turned outwardly at 11 to serve as an abutting means therefor. The plates 8 and 9 are preferably welded to the hub and collar respectively.

The tire 12 is integral with a radial plate member 13 of substantially greater inside diameter than the outside diameter of that portion of the hub 1 which it encircles so as to be capable of radial movement with respect thereto.

In order to support the tire 12 and plate 13, elastic springing elements are interposed between the plate 13 and each plate 2 and 3. The wheel as described to this point is similar except for the addition of the flanges 7, to that revealed in the co-pending application of C. F. Hirshfeld, Serial Number 749,449, filed October 22, 1934. The springing elements, the method of making them and the manner of wheel assembly are novel thereover.

The springing elements are composed of rubber discs 22 having plates 23 surface bonded thereto, the plates having dowel holes 30 therein. Dowel pins 24 must therefore project from the surfaces of the plates 2 and 3 for engagement therewith. These pins 24 are preferably threaded at one end for engagement with similar threads in the dowel holes 25 of the plates 2 and 3. The pins 26 for the plate 13 are threaded at their midsection and extend outwardly from each surface of the plate for engagement with plates on each side thereof. Note that the pins 24 and 26 preferably extend entirely through the plates 23 and that the rubber discs are hollowed out at 27 to prevent chafing. The advantage of this construction is that if one or more dowels is sheared off, perchance, it can be replaced.

In the described springing elements the dowel pins constitute the means for transmitting both radial and tangential forces or loads. In other words, friction between the springing element plates and the main plates is not relied upon because slippage of even a fraction of an inch will render the wheel unfit for service.

In order to further facilitate the assembling operation, I recommend the use of one or more assembly pins 28 upon which the individual parts may be "threaded." The plates 2, 3, 13 and the springing elements are each provided with small holes 29 for the purpose so that before the members are in contact the pins 28 are inserted through them so that when the members are thus pressed toward each other the dowels go into place. Even without the pins 28, the holes 29 can be used for visually alining the plates. Removable plugs may be placed in the holes 29 of the exterior members for normal operation. With this assembly means it is obvious that the dowel or stud members do not have to be symmetrical and uniformly spaced to be able to readily assembly the wheel but it is recommended that they be so positioned because of other obvious considerations.

When the tread surface of a resilient wheel is ground it has been found that the surface may not be truly round unless resiliency of the rubber springing elements is first obviated. In other words, the tire must be held rigidly with respect to the hub during grinding. The holes 29 and the pins 28 lend themselves for use for this purpose as it is obvious that there can be no radial movement of the tire with respect to the hub when the pins are in place and the wheel is normally assembled. As a matter of fact the pins for grinding would not be exactly the same as the assembly pins as they may be shorter as shown in Fig. 4 and a cotter pin or nut 31 would be provided to prevent their displacement during rotation for the grinding.

The holes 29 may be at any desired radial distance from the inner to the outer circumference of the rubber elements. They are illustrated as being outwardly of the conical plates but they do not have to be as these plates may be punched also. The position illustrated is preferred.

What is claimed is:

The method of re-surfacing the tire tread of a resilient wheel comprising a hub portion having spaced radial plate members, a tire having a plate radiating inwardly therefrom, said tire plate being separated from said hub plates by rubber-like elements adapted to resist relative radial movements of said plates in shear, said tire plate and said hub plates having a plurality of sets of aligned holes therethrough, which consists in inserting a pin through each set of said holes whereby to rigidify said tire plate against radial movement with respect to said hub, and in rotating said wheel about its axis while making pressure contact of said tire tread with a grinding means.

EMIL H. PIRON.